No. 726,236. PATENTED APR. 28, 1903.
F. L. AINSWORTH.
ATTACHMENT FOR TEAM HARNESS.
APPLICATION FILED MAY 27, 1902.
NO MODEL.

Witnesses:
Inventor
F. L. Ainsworth.
By Fischer & Thorpe
Attys.

UNITED STATES PATENT OFFICE.

FREDERICK L. AINSWORTH, OF TURNER, KANSAS, ASSIGNOR OF ONE-HALF TO JOHN J. HOVEY, OF KANSAS CITY, KANSAS.

ATTACHMENT FOR TEAM-HARNESS.

SPECIFICATION forming part of Letters Patent No. 726,236, dated April 28, 1903.

Application filed May 27, 1902. Serial No. 109,238. (No model.)

*To all whom it may concern:*

Be it known that I, FREDERICK L. AINSWORTH, a citizen of the United States, residing at Turner, in the county of Wyandotte and State of Kansas, have invented certain new and useful Improvements in Attachments for Team-Harness, of which the following is a specification.

My invention relates to attachments for team-harness; and my object is to produce an attachment of this character for use more especially in connection with vehicles whose tongues are subject to strain and violent jerks—such as wheeled scrapers, farm machinery, &c.—so that the frequent downward jerks of the tongue shall be imposed upon the backs and hind quarters of the animals instead of upon their necks, as is now the case. With the team-harness at present in use the jerking of the collars by the tongue soon develops sore spots on the animals' necks and renders them unfit for service unless properly taken care of. While this trouble occurs most frequently where the animals are hitched to wheeled scrapers, it is true to a limited extent of a team hitched to any vehicle provided with a tongue, it being obvious that where four-wheeled vehicles are employed the weight of the vehicle and its load is not imposed upon the necks of the animals, the latter, however, being subjected to an erratic vibration of the tongue induced by travel over rough roads or stones.

The invention consists in the use of a short back-strap or saddle padded or not, as desired, a pair of straps connecting the ends of the saddle or back-strap with the breeching, and a pair of straps connecting the ends of the saddle or back-strap with the breast-straps, said straps being so connected to the hames that they cannot swing below the collar and abrade against the animal.

The invention further consists in certain novel and peculiar features of construction and combinations of parts, as hereinafter described and claimed, and in order that it may be fully understood reference is to be had to the accompanying drawings, in which—

Figure 1:
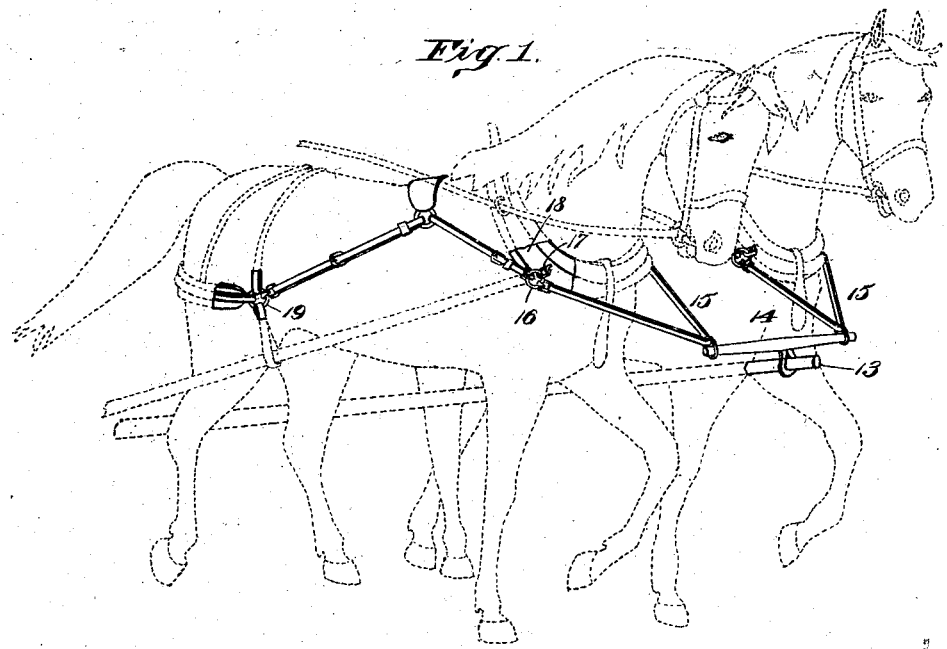
Figure 2:
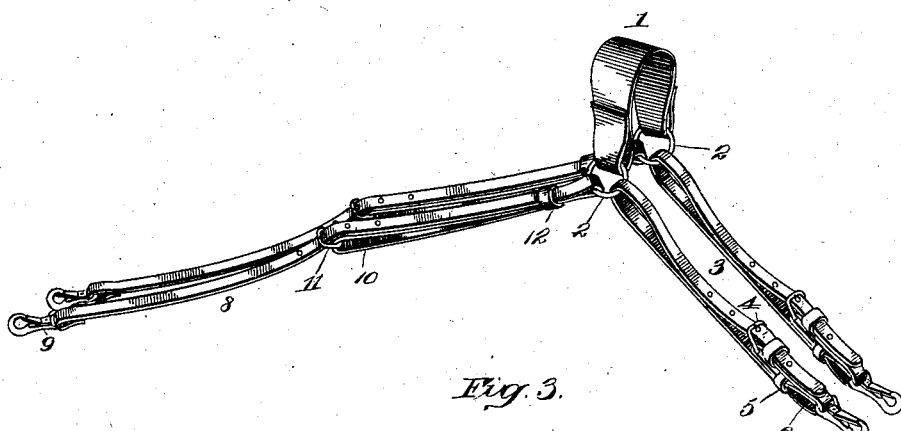
Figure 3:
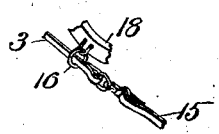

Figure 1 represents a perspective view of a team of horses harnessed to a vehicle, the tongue only of which appears, and equipped with harness attachments embodying my invention. Fig. 2 is a detail perspective view of the harness attachment. Fig. 3 is a detail perspective view showing a different method of uniting the harness attachment to the hames and breast-strap.

In the said drawings, 1 designates a short saddle or back-strap which preferably is of considerable width and short length and which may be padded or not, as desired, and 2 designates rings or loops at the ends of said saddle or back-strap.

3 designates straps looped through the rings or loops 2 and provided with buckles 4, engaged by the perforated ends of the straps in the usual manner, so that the straps may be lengthened and shortened. At the front ends of the straps when buckled are loops 5, through which the buckle-carrying ends of the straps slidingly extend, so as to form forward of loops 5 the loops 6, wherein are secured snap-hooks 7 or equivalent devices.

8 designates straps looped through and extending rearwardly from rings or loops 2, the outer or upper strands of said looped straps being provided with snap-hooks 9 or equivalent devices at their rear ends. The inner strands of said straps are bent back upon themselves, so as to form loops 10, wherein are secured buckles 11 for engagement with the perforated portion of the outer strands of the straps, the free ends of loop portions 10 being confined properly by means of the loops 12, through which the outer strands of the straps and said ends slidingly extend.

13 designates the tongue of the vehicle, and mounted upon the same in the usual or any preferred manner is the neck-yoke bar 14, the same being connected in turn by the breast-straps 15 to the hame-rings 16, said rings being loosely linked in the usual manner, as at 17, to the hames 18.

The attachment of the character described being fastened upon each horse has its snap-hooks 7 engaged with rings 16 and its snap-hooks 9 engaged with the rings 19 of the breeching. The attachment being now in place the straps 3 and 8 are adjusted, if necessary, to accommodate the particular animal. The adjustment should be such that the weight of the tongue should be applied through the breast-straps and rings 16 upon the straps 3, these in turn applying it through the instrumentality of the saddle or back-strap 1 and straps 8 upon the backs and hind quarters of the animals. This object is obviously accomplished because of the flexible connection of the rings 16 with the hames, though it is obvious that, if desired, the same result may be obtained by connecting the straps 3 and the breast-straps directly together, in which case it is necessary that they be so connected to the hames—as, for instance, running one of them through rings 16—that they cannot slip below the collars and by abrasion produce sore spots on the animals.

In action the continual downward swing of the tongue is imposed almost entirely upon those parts of the animal where they are the most capable of resisting strain, the hames and collar acting in this connection more as a guard to prevent injurious abrasion by straps 3 and 15 and as a guide to insure almost direct reciprocation of said straps.

I am aware that saddles or back-straps have been employed in connection with straps leading to the breeching and to the shafts of a racing-vehicle, and therefore do not claim, broadly, a back-strap or saddle provided at each end with straps extending forwardly and rearwardly. I am not aware, however, that prior to my invention any one has ever used an attachment of the character above mentioned in connection with team-harness and bearing such relation to the breast-straps that the downward movement of the tongue shall be resisted by the backs and hind quarters of the animals instead of by their necks and bearing such relation also to the hames that abrasion of the animals by the contiguous parts of the attachment or breast-straps is prevented.

In Fig. 3 the connection is direct to the breast-straps, as above suggested—that is to say, the straps extending forwardly from the saddle or back-strap extend slidingly through rings 16 and forwardly of the latter are connected, as shown or in any other suitable manner, to the breast-straps, the arrangement being such that the downward movement of the tongue is resisted almost entirely by the back-strap and breeching, the hames acting simply to prevent straps 3 from getting back of the collar. Of course the fact that the straps of the attachment can be varied as to length not only accommodates horses of varying size, but also permits the application of some of the weight upon the neck.

From the above description it will be apparent that the invention is susceptible of modification in some particulars without departing from the principle of construction involved, and while I have illustrated and described its preferred embodiment I reserve the right to make changes of the character above indicated.

Having thus described the invention, what I claim as new, and desire to secure by Letters Patent, is—

1. In a harness, the combination with the hames, a back-saddle, and the breeching; of straps having a common point of connection with said saddle, one of them extending thence rearwardly and downwardly to the breeching and the other extending forwardly and downwardly and connected with the hames and also with the breast-strap.

2. In a harness, the combination with the hames, a back-saddle, and the breeching; of straps having a common point of connection with said saddle, one of them extending thence rearwardly and downwardly to the breeching and the other extending forwardly and downwardly and connected with the breast-strap, and a ring carried by each hame and loosely embracing such forwardly-extending strap.

In testimony whereof I affix my signature in the presence of two witnesses.

FREDERICK L. AINSWORTH.

Witnesses:
H. C. RODGERS,
G. Y. THORPE.